United States Patent
Scherer et al.

[19]

[11] Patent Number: 5,934,083
[45] Date of Patent: Aug. 10, 1999

[54] AIR-CONDITIONING SYSTEM FOR AN AIRCRAFT CABIN

[75] Inventors: Thomas Scherer, Hamburg; Uwe Buchholz, Bliedersdorf, both of Germany

[73] Assignee: DaimlerChrysler Aerospace Airbus GmbH, Hamburg, Germany

[21] Appl. No.: 09/028,755

[22] Filed: Feb. 24, 1998

[30] Foreign Application Priority Data

Feb. 27, 1997 [DE] Germany .......................... 197 07 858

[51] Int. Cl.⁶ ..................................................... F25B 7/00
[52] U.S. Cl. ................................... 62/79; 62/172; 62/178
[58] Field of Search ............................. 62/172, 79, 178, 62/180, 186; 165/248, 249

[56] References Cited

U.S. PATENT DOCUMENTS

| | | | |
|---|---|---|---|
| 4,445,342 | 5/1984 | Warner | 62/172 |
| 4,963,174 | 10/1990 | Payne | 62/172 X |
| 4,966,005 | 10/1990 | Cowell et al. | 62/172 X |
| 5,553,461 | 9/1996 | Hitzigrath et al. | 62/172 X |

FOREIGN PATENT DOCUMENTS 0537296  1/1995  European Pat. Off. .
3330556  3/1984  Germany .

*Primary Examiner*—Henry Bennett
*Attorney, Agent, or Firm*—W. F. Fasse; W. G. Fasse

[57] ABSTRACT

The climate in one or more aircraft cabin zones is controlled to achieve a minimal use of fresh air and an optimal use of recirculation air while satisfying official regulation requirements and avoiding freeze-ups in the air duct system of commercial aircraft. For this purpose temperature sensors ascertain a plurality of different actual temperature informations at different locations in the air supply system. Valve position sensors provide actual flow volume information from one or more valve locations. An r.p.m., volumetric flow or differential pressure sensor provides actual blower r.p.m., volumetric flow or differential pressure information. A CPU compares the actual information with rated information stored in a memory or entered through a keyboard to provide control signals, including closed loop control and/or open loop control signals, to a blower or blowers, a valve or valves, and to at least one air conditioner. The control is such, that the total air supply volume of mixed air into the cabin corresponds to the sum of a minimal fresh air supply volume plus an optimal used air recirculation volume. A minimal discharge of used air out of the cabin is assured.

13 Claims, 2 Drawing Sheets

AIR-CONDITIONING SYSTEM FOR AN AIRCRAFT CABIN

PRIORITY CLAIM

This application is based on and claims the priority under 35 U.S.C. §119 of German Patent Application 197 07 858.3, filed on Feb. 27, 1997. The entire disclosure of German Patent Application 197 07 858.3 is incorporated herein by reference.

FIELD OF THE INVENTION

The invention relates to a method and apparatus for a closed and open loop control of air flows and temperatures in an air-conditioning system for an aircraft, particularly a cabin in a passenger aircraft.

BACKGROUND INFORMATION

The interior of a commercial aircraft, such as a passenger aircraft, is divided into at least one passenger space or cabin and a loading space for luggage and/or freight. These spaces, especially the passenger cabin, are divided into temperature zones which are controllable in a closed loop or open loop manner independently of one another. Official regulations require that a minimal fresh air volume is introduced into the passenger cabin per passenger during defined time durations. The fresh air is provided by feeding highly compressed hot fresh air with one or more high pressure blowers for a high pressure air distribution in the aircraft. The highly compressed fresh air passes from a high pressure source through a closed loop flow volume control valve and enters from the exit of the valve into an air-conditioning system which decompresses and cools the fresh air to a pressure and temperature suitable for use in the aircraft. The so-conditioned air exiting from the air-conditioning system is introduced into a low pressure air distribution system including an air mixer, wherein the air-conditioned air is mixed with a portion of used cabin air. The portion of used cabin air is withdrawn with a low pressure blower or ventilator from the passenger cabin and supplied to the mixer which also receives the fresh conditioned air. The mixed air is then supplied to one or several temperature zones in the aircraft, whereby a so-called "trim system" assures a closed loop temperature control individually for the several temperature zones in the aircraft. According to European Patent Application EPO 537,296 B1 the trim system includes a controller for monitoring and for controlling the feedback control values or signals.

It is further known that the air-conditioning or cooling "packs" in an aircraft can produce air temperatures below the water freezing point, especially when the humidity in the air is high. Thus, it is necessary that humidity contained in the air supplied to the air-conditioning system in an aircraft is first removed in order to prevent the formation of ice and/or snow in the air conditioner, in the air ducts or pipes or air conduits to thereby assure the required freeze up protection. This freeze up protection limits the possible cooling capacity of the air-conditioning packs depending on the moisture or water content of the incoming air. Freeze-ups are trouble sources for the system because flow cross-sectional areas may be reduced by such freeze-ups, particularly in flow critical locations within the system, such as pipes and structural system components, for example valves. A complete clogging due to freeze-ups must be prevented because air pipes could burst and cause a catastrophe in an aircraft. Even reductions in the flow cross-sectional area due to partial freeze-up must be avoided because noise caused by air flowing through reduced cross-sectional flow areas impairs the passenger comfort. Partial freeze-ups causing unwanted noise have a tendency to occur when the fresh air supply has been reduced to the minimally permissible volume, whereby the temperature of the output air from the air conditioner may sink below the freezing point of water, while at the same time, the output air still contains a remainder moisture content which reduces the cooling capacity of the air-conditioning system. German Patent Publication DE 3,330,556 C2 discloses that a freeze-up in the recirculation of the turbine air can be minimized by recirculating cabin air.

The prior art still leaves room for improvement, especially with regard to avoiding or preventing freeze-ups in the air flow cross-sectional area of the air pipes, ducts, conduits of the low pressure air distribution system while simultaneously assuring a minimal admixture of fresh air to the air recirculated from the aircraft cabin to produce mixed air to be supplied into the cabin.

OBJECTS OF THE INVENTION

In view of the foregoing it is the aim of the invention to achieve the following objects singly or in combination:

- to improve a closed and open loop air flow control and conditioning system for an aircraft especially a passenger aircraft in such a way that the recirculation of used cabin air to which fresh air has been admixed, is performed in response to the heat balance of a cabin section or temperature zone, preferably the zone with the highest heat load, or individually for each zone;
- to assure that in such a closed loop and open loop air flow control system the mass of fresh air admixed to the recirculation used air, always satisfies the officially required minimum mass flow under all operating conditions while the volume of recirculation used air is optimized to avoid freeze-ups in the low pressure distribution system throughout the aircraft thereby assuring an unimpeded flow throughout the fresh air and mixed air distribution system and is maximized to obtain a required cabin ventilation;
- to provide a method for efficiently operating such a system in response to current operating conditions and official regulation requirements.

SUMMARY OF THE INVENTION

An air-conditioning system for an aircraft cabin, said system comprising an air supply section (A) and an air mixing section (B), wherein said air supply section (A) comprises a source (1) of hot pressurized air, a flow volume control valve (3) and an air conditioner (4), wherein said air mixing section (B) comprises at least one air mixer (6), a blower (11) and a used air recirculation circuit (9A) connecting a suction inlet of said blower (11) to a used air outlet (9) of said cabin and an outlet of said blower into said air mixer for recirculating used cabin air into said air mixer, said system further comprising air flow ducts connecting said source (1), said valve (3), said air conditioner (4), said air mixer (6), and an air inlet (7) of said cabin in a series circuit with one another for supplying fresh air to said mixer and mixed air into said cabin, a central processing unit CPU, a first temperature sensor (14) positioned in said cabin and connected to said CPU for providing a cabin air actual first temperature signal to said CPU, a second temperature sensor (16) positioned and connected to said CPU for providing a mixed air actual second temperature signal to said CPU, a third temperature sensor positioned and connected to said CPU for providing a conditioned air actual third temperature signal to said CPU, an r.p.m. or volume flow or differential pressure sensor positioned and connected to said CPU for providing an actual blower volumetric flow signal to said CPU, a flow volume sensor positioned and connected to said CPU for providing an actual flow volume signal to said CPU and means for providing rated values to said CPU, wherein said CPU compares actual signal values with rated signal values for producing control signals for said flow volume control valve (3), for said air conditioner (4), and for said blower (11), respectively connected to said CPU for controlling said valve (3), said air conditioner (4) and said blower (11) in a closed and/or open loop manner so that the volume of fresh air supplied to said mixer (6) is minimized within regulation limits while the supply of used air to said mixer through said blower is optimized to maintain the mixed air actual second temperature of a rated value while the said first and third temperature are maintained at rated values in accordance with a heat balance of said cabin.

According to the invention there is further provided a method for air-conditioning at least one aircraft cabin, said method comprising the following steps:

(a) providing a first group of actual information signals including:

(b) sensing an actual cabin temperature and producing a respective actual temperature first signal, (c) sensing an actual mixed air temperature and producing a respective actual temperature second signal, (d) sensing an actual conditioned fresh air temperature at an output of an air conditioner and producing a respective actual temperature third signal, (e) sensing an actual blower r.p.m. or volume flow or differential pressure of a blower that recirculates used cabin air into an air mixer for mixing used cabin air with conditioned fresh air in said mixer to provide said mixed air and producing an actual volumetric flow fourth signal, (f) measuring an actual volume flow of fresh air from a source through a fresh air volume flow controller and producing a respective actual fresh air volume fifth signal, (g) feeding said first group of actual information signals to a central processing unit, (h) providing a second group of actual and rated information signals for said central processing unit, (i) processing said first and second group of signals in said central processing unit for producing control signals for said fresh air volume flow controller, for said air conditioner and for said blower respectively, and (j) controlling said fresh air volume flow controller, said air conditioner and said blower in response to respective control signals of said control signals so that the use of fresh air from said source is minimized within the official regulation limits, while simultaneously the use of recirculated used cabin air is optimized to maintain an actual mixed air temperature at a rated value of second group signals and the actual cabin and conditioned fresh air temperature is maintained at rated values in accordance with a heat balance required of said cabin.

According to the invention, the minimizing of the use of fresh air and control of the use of recirculated air is accomplished by the following steps:

(a) ascertaining in said CPU from signals of said first and second group of signals a difference fresh air volume between a currently actually supplied fresh air volume and a minimal fresh air volume required under current operating conditions as represented by said first and second group of signals, (b) reducing said fresh air volume flowing through said fresh air volume flow controller to said required minimal fresh air volume, and (c) ascertaining in said CPU from signals of said first and second group of signals a mixed air temperature which is in accordance with a rated mixed air temperature by increasing the volumetric flow of said blower, minimum replacing said difference fresh air volume by a corresponding volume of recirculated used cabin air volume.

BRIEF DESCRIPTION OF THE DRAWINGS

In order that the invention may be clearly understood, it will now be described by way of examples with reference to the drawings, wherein.

DETAILED DESCRIPTION OF PREFERRED EXAMPLE EMBODIMENTS AND OF THE BEST MODE OF THE INVENTION

Figure 1:
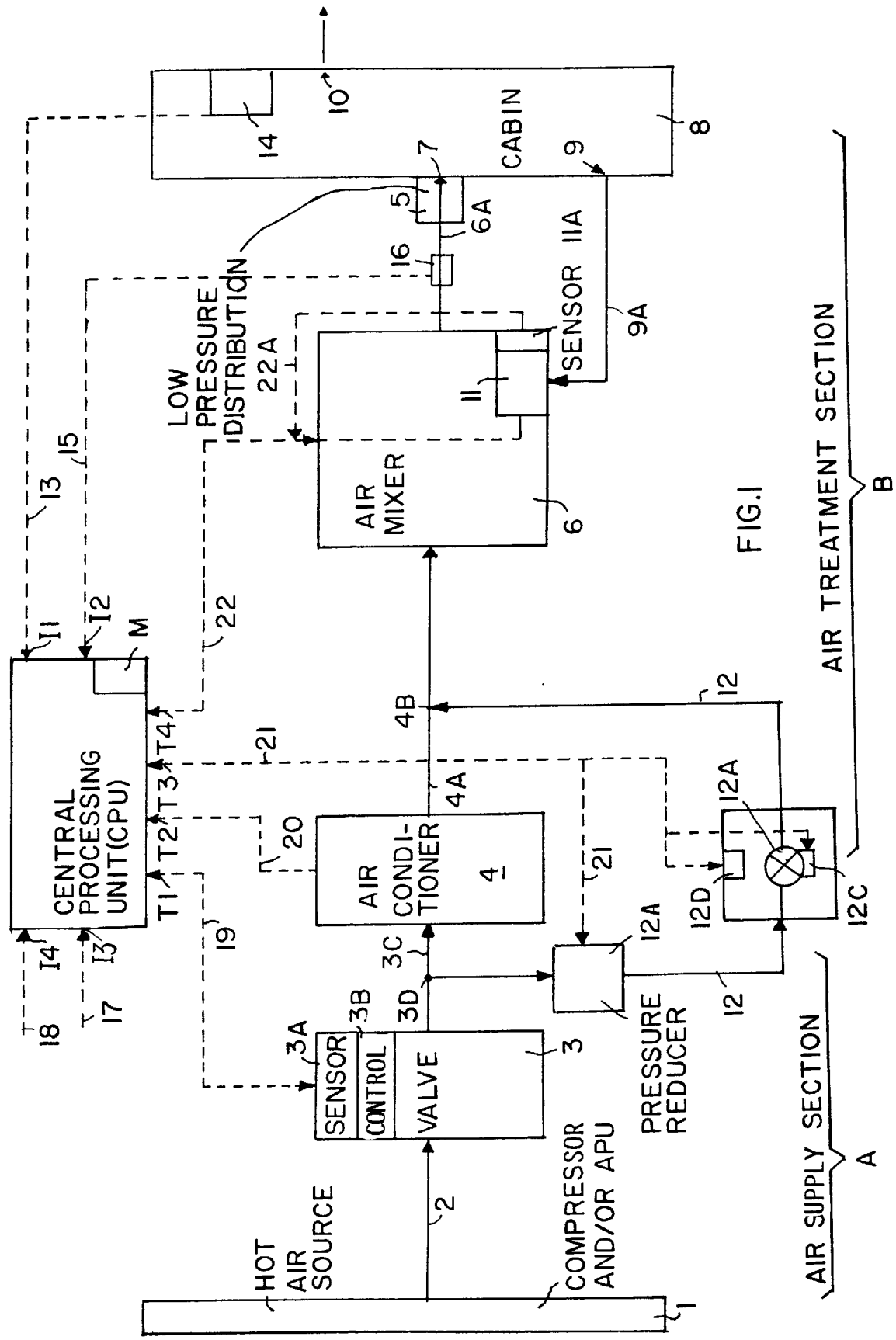
FIG. 1 is a block circuit diagram of the present closed loop or open loop air flow control system, wherein full line connections represent air flow ducts, pipes or conduits while dashed lines represent electrical and/or optical signal conductors.

FIG. 1 shows a closed loop and open loop control circuit for an air volume flow and temperature control of an air ventilation or air-conditioning system of a passenger cabin in an aircraft. The control is responsive in closed loop fashion to the heat balance in the aircraft cabin. Additionally, an open loop control is provided in response to keyboard control inputs and external inputs to a central processing unit CPU.

The present system comprises a high pressure, hot, fresh air distributor or source 1 such as tap air from an engine or an auxiliary power unit (APU) connected through an air duct 2 to a fresh air volume flow control valve 3 including a volume flow sensor 3A and a valve controller 3B. The sensor 3A may, for example, sense the position of a valve member which determines with its position the cross-sectional flow area of the valve 3. An outlet of the valve 3 is connected through an air duct 3C to an air conditioner 4. The air conditioner reduces the high pressure of the hot fresh air to the required cabin temperature and simultaneously controls the air conditioner outlet temperature.

An air duct 4A connects the outlet of the air conditioner 4 to an air mixer or air mixing chamber 6 having an outlet connected through an air duct 6A to a low pressure air distributor 5 incorporating a mixed air inlet 7 of a passenger cabin 8. The passenger cabin 8 has a first used air outlet 9 connected through a recirculation air duct 9A to a suction port of a blower 11 that may be housed in or on the air mixer 6 for blowing recirculation air, namely used cabin air, into the mixer 6. The cabin 8 has a further used air discharge port 10 through which used air is discharged into the atmosphere as indicated by an arrow. Thus, the components 1, 3, 4, 5, 6, 7 are connected in series with each other by the air ducts or conduits 2, 3C, 4A, 6A. An r.p.m. or volume flow or differential pressure sensor 11A senses the r.p.m. or volumetric flow or differential pressure of the blower 11.

A by-pass circuit 12 for controlling and feeding fresh hot air into the conditioned air has a volume flow control valve 12A and a pressure reducer 12B connected in series with each other. The so formed series circuit 12A, 12B is connected in parallel to the air conditioner 4 at junctions 3D and 4B in the air ducts 3C and 4A respectively. Hot air from the hot air control by-pass circuit 12 and air out of the air-conditioner 4 are mixed at the junction 4B. The hot air volume flow control valve 12A of the hot air control circuit 12 are controlled by respective control signals from the CPU. For this purpose a flow volume sensor 12D and a valve controller 12C are connected to the CPU. The pressure reducer 12B may be a similarly controlled valve, such as valve 12A.

The hot air source 1, the flow volume hot air control valve 3, the pressure reducer 12B and the air conditioner 4 form an air supply section A. The air mixer 6, the low pressure air distributor 5, the blower 11 and the recirculation circuit 9A, 6A form an air mixing section B. The flow control valve 12A is part of the air mixing section B.

Referring further to FIG. 1, the CPU forms a closed loop control unit with regard to actually sensed information and an open loop control with regard to externally inputted information. The CPU has, for example four inputs I1, I2, I3 and I4 for receiving actually sensed and externally produced information and four input/output terminals T1, T2, T3 and T4 for receiving sensed information and for providing control signals. A signal conductor 13 connects a temperature sensor 14 in the cabin 8 with the input I1 of the CPU to provide an actual first temperature signal. A further signal conductor 15 connects a second temperature sensor 16 to the second input I2 of the CPU to provide a second actual temperature signal. The temperature sensor 16 is positioned to measure the temperature of the mixed air supply passing through the duct 6A, the low pressure distributor 5 and the inlet 7 into the cabin 8. A further control input I3 of the CPU is connected through a signal conductor 17 to the cockpit for receiving manually or automatically generated signals provided by the crew and/or by instruments such as information regarding the current flight altitude, outside temperature or the like. Similarly, a signal conductor 18 connects the input I4 to a control panel accessible to the cabin attendants to provide further input signals to the CPU such as the number of passengers in the cabin 8, or in different temperature zones of the cabin, the rated temperature for the cabin or cabin zones and similar information. The CPU has a memory and processor M including comparator circuits for comparing actually sensed values with rated values stored in the memory or with values provided through keyboards not shown.

A signal or data bus 19 connects the terminal T1 with an input-output of the valve 3 to receive information from the sensor output 3A of the hot air flow volume control valve 3 and to provide control information to the valve controller 3B. A signal or data bus 20 connects the terminal T2 to the air conditioner 4 to receive sensed temperature information providing a third actual temperature signal to the CPU from the air conditioner and to supply control information to the air conditioner 4. A further data or signal bus 21 connects the terminal T3 of the CPU to the valve controller 12C, to a possible flow volume sensor 12D of the hot air control valve 12A the pressure reducer 12B may also be connected to bus. A further data or signal bus 22 connects the terminal T4 of the CPU to a control input and to an RPM or volumetric flow or differential pressure sensor of the recirculation air blower 11. These data buses 19, 20, 21, 22 may be electronic or optical signal conductors and each bus contains the required number of conductors.

The system of FIG. 1 is operated by the CPU in response to system actual status information from the temperature sensors 14, 16 of the system and from a temperature sensor in the air conditioner 4 and in response to command signals from the cockpit, from a control panel accessible to flight attendants or other CPU's. Thus, the temperature sensor 14 provides information regarding the actual cabin temperature on the signal conductor 13 thereby providing an actual first temperature signal or value. The temperature sensor 16 provides actual temperature information of to the mixed air being blown into the cabin 8 through the inlet 7, thereby providing an actual second temperature signal. The temperature signal from the air conditioner 4 provides the third actual temperature signal. An r.p.m. or volumetric flow or differential pressure sensor 11A forming part of the recirculation air blower 11 senses the actual r.p.m. or volumetric flow or differential pressure of the blower and provides that information through the signal conductor or data buses 22 and 22A to the central processing unit CPU.

The possible flow volume sensor 12D of the hot air bypass flow control valve 12A may ascertain, for example the extent to which the flow volume control valve 12A is open or closed, for example by sensing a position of a movable valve member. The pressure reducer 12B may be a pressure reduction valve responsive to reduce the high pressure hot air to the air mixer 6 pressure level either self controlled or controlled by a control signal provided on the signal conductor or data bus 21.

The above mentioned three temperature values or signals, the actual r.p.m. or volumetric flow or differential pressure value or signal, and the fresh air volume flow value from the sensor 3A form a first group of signals. Stored or inputted rated values or inputted actual values such as the actual number of passengers form a second group of signals. The CPU processes the just mentioned signal values representing various information in accordance with a program stored in the memory M of a CPU and provides the respective control signals through the corresponding conductors in the data busses 19, 20, 21, 22, 22A. Thus, a control signal to the valve 3 will open or close the valve, more or less. A control signal over the conductor 20 will control the temperature of the air exiting from the air-conditioner 4. A control signal on the conductor 21 will control the pressure reducer 12B and the volume of hot air flowing through the hot air bypass circuit 12 to the mixing junction 4B where conditioned air and bypass hot air are mixed. A signal through the conductor 22 will control the r.p.m., the volumetric flow or differential pressure of the blower 11.

In addition to the just mentioned information, the CPU takes into account, for example the actual pressure outside the aircraft body or the altitude of aircraft and other information provided by other CPU's, the pilot and/or the flight attendants. The CPU compares rated values stored in its memory M or received on inputs I3, I4 with actual information values received on inputs I1, I2 and on Terminals T1 to T4 to provide the required closed loop and/or open loop control signals to the control conductors in the data buses 19, 20, 21, 22.

Referring further to FIG. 1 the air flow sequence from the high pressure hot air blower or generator or source 1 to the cabin 8 is indicated by the arrow heads at the ends of the air ducts 2, 3C, 4A, and 6A, whereby the components 1, 3, 4, 5, and 6 are connected in a series circuit as mentioned. The air flow into the cabin 8 at the inlet 7 and the air flow out of the cabin at the outlet 9 is regulated by the CPU in accordance with the heat balance required in the cabin 8 as measured by the temperature sensors 14 and 16 and in accordance with other parameters described below.

More specifically, the present control takes into account at least three temperature values namely those provided on the conductors 13, 15 and 20. Further, actual volume flow signals representing the flow through the fresh air control valve 3 are taken into account. The control may also take into account the current flight altitude, the number of passengers actually present in the cabin, the rated cabin temperature, and similar values, whereby the actual measured values are then compared with the rated values to ascertain the required minimal fresh air volume through the valve 3, the minimally acceptable temperature at the outlet of the air conditioner 4, and the required increase or decrease of the r.p.m., volumetric flow or differential pressure of the blower 11 in the mixer 6. When the blower r.p.m., volumetric flow or differential pressure is increased more air is recirculated from the cabin through the duct 9A. When the blower r.p.m., volumetric flow or differential pressure is reduced, less air is recirculated through the duct 9A. The r.p.m., volumetric flow or differential pressure control of the blower 11 determines the volume of mixed air returned through the duct 6A into the cabin 8. The CPU continuously calculates and updates the required air volumes that must be introduced into the cabin 8 and the temperature required to maintain the heat balance in the cabin 8 and to keep the mixed air temperature at a rated value. In this control the supply of fresh air through the valve 3 is maintained below a level that would be necessary for maintaining a required minimum cabin ventilation rate without any recirculating air through the duct 9A thereby saving energy. The resulting mixed air introduced into the inlet 7 of the cabin 8 has two volume components, namely a minimally acceptable fresh air volume component and an optimal or maximally acceptable recirculated used air component. According to the invention the fresh air component is minimized while the recirculation component is optimized or maximized to save energy while simultaneously satisfying even official regulations to which these fresh air volumes must be acceptable and the required temperatures.

Figure 2:
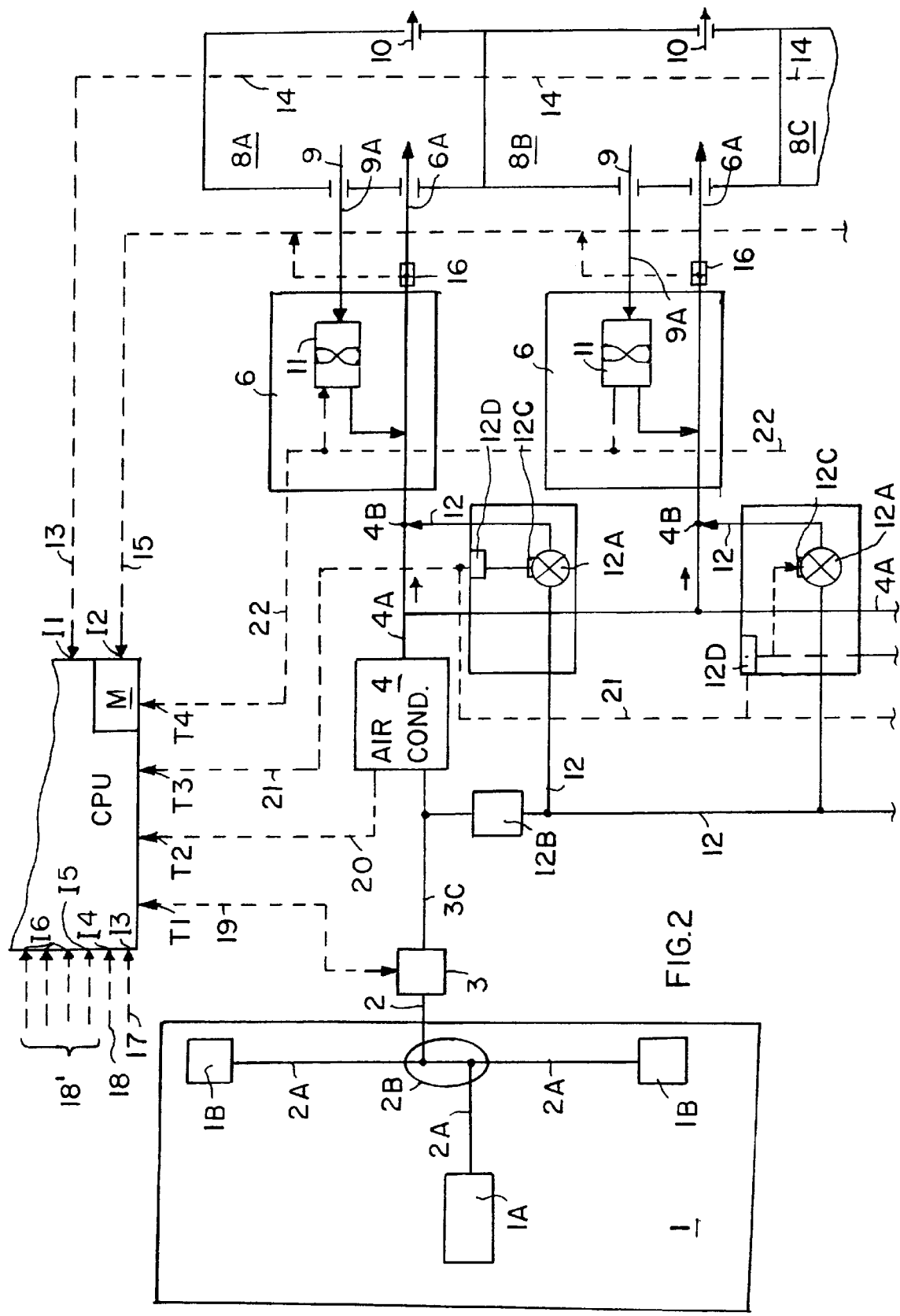
FIG. 2 is a block diagram similar to that of FIG. 1, however illustrating the present air-conditioning system modified for servicing several temperature zones or several cabin sections, whereby again the full line connections are air flow connections while the interrupted lines represent either electrical or optical signal conductors.

In FIG. 2 the components that are the same as in FIG. 1 are provided with the same reference numbers as in FIG. 1 supplemented by letters where necessary. In FIG. 2 the fresh air supply section includes the fresh air source 1, the volume flow control valve 3, the air conditioner 4 and the pressure reducer 12B. These components and the CPU are provided in common for all temperature zones 8A, . . . into which the cabin 8 is divided. However, the air mixers 6 with their respective blowers 11 and the hot air bypass valves 12A with their respective air flow bypass ducts 12 are provided individually for each cabin zone 8A to 8N. The hot, pressurized fresh air source 1 may comprise a tap air source from an engine 1A and/or auxiliary power units 1B connected through ducts 2A to a junction 2B with the duct 2 to the valve 3.

FIG. 2 illustrates an embodiment of an air flow system according to the invention adapted for supplying a plurality of cabin zones 8A, 8B, 8C . . . , with the required mixed air while maintaining the comfort temperature or temperatures in these different cabin zones 8A, . . . , at officially required levels. For example, if there are a hundred passengers in zone 8A, and only twenty-five passengers in zones 8B, these facts will be taken into account by respective input signals to the CPU, for example on input I3 or I4 from a control panel accessible to the crew and connected to the CPU through signal conductors 17, 18. Each cabin zone has its own air mixer 6, blower 11, recirculating duct 9A, low pressure air distributor 5 and its own hot air bypass valve 12A with a respective bypass circuit 12. The pressure reduction or reducer valve 12B are provided in common for all separate cabin zones.

Each of the air mixers 6 receives recycled air from the cabin zone that is served by the respective air mixer. The data bus 22 comprises individual control conductors connected to the separate blowers 11 in the individual mixers 6. Thus, the volume of recirculated air through the ducts 9A can be individually controlled for each cabin zone, for example, more air can be recirculated from and to a cabin zone with fewer passengers compared to a cabin zone with more passengers.

In FIG. 2, just as in FIG. 1, a continuous information and control exchange takes place between the various sensors and the CPU, whereby the information supplied to the CPU includes, as in FIG. 1, the temperatures of the mixed air passing through the air ducts 6A leading from the mixers 6 to the respective cabin zone and the temperatures measured at 14 in the respective cabin zones. These actual temperature values are supplemented by the valve position information in the fresh air closed loop control valve 3, the positions of the valve members that control the flow area cross-section in the hot air by-pass valves 12A connected in parallel to the air conditioner 4, the air conditioner output temperature on the conductor 20 and the r.p.m., volumetric flow or differential pressure of each of the blowers 11 in the mixers 6. The respective data buses 22 provide different actual r.p.m., volumetric flow or differential pressure signals from the blowers 11 to the CPU. Other external information is provided to inputs I3 to I6 on respective conductors 17, 18, 18' regarding the flight altitude, the number of passengers in different cabin zones, the different temperatures desired for each cabin zone, and various other comfort information values, such as external pressures.

The actual measured values or values inputted through a keyboard are compared with rated values stored in the memory M of the CPU and the results of the comparing are then fed back as control signals to the various valves and r.p.m., volumetric flow or differential pressure controls for the blowers 11.

The cabin zone through which the largest heat flow is generated requires the lowest inlet temperature for the respective cabin zone. For example, a cabin section holding currently one hundred and fifty passengers requires a mixed air temperature that is substantially lower than the mixed air temperature for another cabin zone holding currently only twenty passengers.

Further, the temperature at the outlet 4A of the air conditioner 4 must be maintained at a level that will prevent the above mentioned freeze-ups or partial freeze-ups, and with due regard to the heat balance to be maintained in the respective cabin zone 8A, . . . . The operation of the system is continuously updated by the continuous measurement of the actual values of the system and comparing the actual values with rated values in comparator circuits of the CPU to provide the required control signals for the blowers 11 and valves as described.

Similarly, more used air can be recirculated after mixing with fresh air, into the cabin zone with fewer passengers than into a cabin zone with more passengers because the quality of air coming from a cabin zone currently occupied by many passengers is lower than the air quality from a cabin zone with fewer passengers.

In addition to avoiding freeze-ups, the invention properly applied, saves fuel because the temperature control for each cabin zone is tailored to the individual needs of that zone with due regard to satisfying legal regulation requirements imposed by the government licensing the particular aircraft.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. An air-conditioning system for an aircraft cabin, said system comprising an air supply section (A) and an air mixing section (B), wherein said air supply section (A) comprises a source (1) of hot pressurized air, a flow volume control valve (3) and an air conditioner (4), wherein said air mixing section (B) comprises at least one air mixer (6), a blower (11) and a used air recirculation circuit (9A) connecting a suction inlet of said blower (11) to a used air outlet (9) of said cabin and an outlet of said blower into said air mixer for recirculating used cabin air into said air mixer, said system further comprising air flow ducts connecting said source (1), said valve (3), said air conditioner (4), said air mixer (6), and an air inlet (7) of said cabin in a series circuit with one another for supplying fresh air to said mixer and mixed air into said cabin, a central processing unit CPU, a first temperature sensor (14) positioned in said cabin and connected to said CPU for providing a cabin air actual first temperature signal to said CPU, a second temperature sensor (16) positioned and connected to said CPU for providing a mixed air actual second temperature signal to said CPU, a third temperature sensor positioned and connected to said CPU for providing a conditioned air actual third temperature signal to said CPU, an r.p.m., volumetric flow or differential pressure sensor positioned and connected to said CPU for providing an actual blower r.p.m., volumetric flow or differential pressure signal to said CPU, a flow volume sensor positioned and connected to said CPU for providing an actual flow volume signal to said CPU and means for providing rated values to said CPU, wherein said CPU compares actual signal values with rated signal values for producing control signals for said flow volume control valve (3), for said air conditioner (4), and for said blower (11), respectively connected to said CPU for controlling said valve (3), said air conditioner (4) and said blower (11) in a closed and/or open loop manner so that the volume of fresh air supplied to said mixer (6) is minimized within the regulation limits while the supply of used air to said mixer through said blower is optimized to maintain the mixed air actual second temperature at a rated value while the said first and third temperature are maintained at rated values in accordance with a heat balance required in said cabin.

2. The system of claim 1, further ascertaining with said CPU the supply of a maximized volume of supplied mixed air to the said cabin by variation of the used air supplied to the said mixer through the said blower.

3. The system of claim 1, further comprising a by-pass circuit (12) connected in parallel to said air conditioner (4), for feeding hot air into fresh air from said air conditioner (4).

4. The system of claim 2, wherein said by-pass circuit (12) comprises a pressure reducer (12B) and a flow volume controller (12A) connected in a series circuit with each other, said series circuit being connected in parallel to said air conditioner.

5. The system of claim 3, wherein said flow volume controller (12A) is a valve (12A) including a flow volume sensor (12D) connected to said CPU for providing an actual hot air flow volume signal to said CPU from said valve (12A).

6. The system of claim 1, comprising an individual air mixing section (B) for each of a plurality of cabin zones (8A, 8B, . . . ), and wherein each of said individual air mixing sections is connected in common to said air supply section and to said CPU.

7. The system of claim 6, further comprising a hot air by-pass circuit (12, 12A) for each of said individual air mixing sections, and wherein all hot air by-pass circuits are connected in parallel to said air conditioner (4).

8. The system of claim 1, comprising electrical or optical conductors between said CPU and said sensors.

9. A method for air-conditioning at least one aircraft cabin, said method comprising the following steps:

(a) providing a first group of actual information signals including:

(b) sensing an actual cabin temperature and producing a respective actual temperature first signal, (c) sensing an actual mixed air temperature and producing a respective actual temperature second signal, (d) sensing an actual conditioned fresh air temperature at an output of an air conditioner and producing a respective actual temperature third signal, (e) sensing an actual blower r.p.m. or volumetric flow or differential pressure of a blower that recirculates used cabin air into an air mixer for mixing used cabin air with conditioned fresh air in said mixer to provide said mixed air and producing an actual r.p.m., volumetric flow or differential pressure fourth signal, (f) measuring an actual volume flow of fresh air from a source through a fresh air volume flow controller and producing a respective actual fresh air volume fifth signal, (g) feeding said first group of actual information signals to a central processing unit, (h) providing a second group of actual and rated information signals for said central processing unit, (i) processing said first and second group of signals in said central processing unit for producing control signals for said fresh air volume flow controller, for said air conditioner and for said blower respectively, and (j) controlling said fresh air volume flow controller, said air conditioner and said blower in response to respective control signals of said control signals so that the use of fresh air from said source is minimized within the official regulation limits, while simultaneously the use of recirculated used cabin air is optimized to maintain an actual mixed air temperature at a rated value of second group signals and the actual cabin and conditioned fresh air temperature is maintained at rated values in accordance with a heat balance required of said cabin.

10. The method of claim 9, wherein said use of fresh air is minimized and said use of recirculated cabin air is controlled by the following steps:

(a) ascertaining in said CPU from signals of said first and second group of signals a difference fresh air volume between a currently actually supplied fresh air volume and a minimal fresh air volume required under current operating conditions as represented by said first and second group of signals, (b) reducing said fresh air volume flowing through said fresh air volume flow controller to said required minimal fresh air volume, and (c) ascertaining in said CPU from signals of said first and second group of signals a mixed air temperature which is in accordance with a rated mixed air temperature by increasing the volumetric flow of said blower, minimum replacing said difference fresh air volume by a corresponding volume of recirculated used cabin air volume.

11. The method of claim 9, wherein said first group of signals and said second group of signals are produced as electronic or optical signals which are processed in said CPU, and wherein said control signals are transmitted as electronic or optical signals for controlling said fresh air volume flow controller, said air conditioner and said blower.

12. The method of claim 9, further comprising dividing said aircraft cabin into a plurality of temperature zones, producing mixed air individually for each cabin zone, feeding produced mixed air individually into each cabin zone, and supplying hot fresh air to an air conditioner provided in common for all individual air mixers.

13. The method of claim 12, further comprising individually by-passing said air conditioner with hot air for each individual air mixer.

* * * * *

UNITED STATES PATENT AND TRADEMARK OFFICE
CERTIFICATE OF CORRECTION

PATENT NO. : 5,934,083
DATED : Aug. 10, 1999
INVENTOR(S) : Scherer et al.

It is certified that error appears in the above-identified patent and that said Letters Patent is hereby corrected as shown below:

Col. 5, line 26, after "sensed", replace "information" by --informations--;
       line 28, before ".", replace "information" by --informations--;
       line 30, before "and", replace "information" by --informations--;

Col. 6, line 55, after "mentioned", replace "information" by --informations--;
       line 58, before "provided", replace "mation" by --mations--.

Col. 9, line 65, after "of", replace "claim 2" by --claim 3--.

Col. 10, line 3, after "of", replace "claim 3" by --claim 4--.

Signed and Sealed this

Twenty-eighth Day of March, 2000

Attest:

Q. TODD DICKINSON

*Attesting Officer*      *Commissioner of Patents and Trademarks*